(12) United States Patent
Hanrahan

(10) Patent No.: US 12,129,802 B2
(45) Date of Patent: Oct. 29, 2024

(54) SELECTIVE POWER DISTRIBUTION FOR AN AIRCRAFT PROPULSION SYSTEM

(71) Applicant: Raytheon Technologies Corporation, Farmington, CT (US)

(72) Inventor: Paul R. Hanrahan, Sedona, AZ (US)

(73) Assignee: RTX CORPORATION, Farmington, CT (US)

( * ) Notice: Subject to any disclaimer, the term of this patent is extended or adjusted under 35 U.S.C. 154(b) by 44 days.

(21) Appl. No.: 17/903,681

(22) Filed: Sep. 6, 2022

(65) Prior Publication Data

US 2024/0077033 A1 Mar. 7, 2024

(51) Int. Cl.
*F02C 7/36* (2006.01)

(52) U.S. Cl.
CPC .......... *F02C 7/36* (2013.01); *F05D 2220/323* (2013.01); *F05D 2260/40311* (2013.01); *F05D 2260/902* (2013.01)

(58) Field of Classification Search
CPC ................ F02C 7/36; F05D 2220/323; F05D 2260/40311; F05D 2260/902
USPC ........................................................ 415/116
See application file for complete search history.

(56) References Cited

U.S. PATENT DOCUMENTS

| | | | |
|---|---|---|---|
| 3,678,690 A | 7/1972 | Shohet | |
| 4,651,521 A | 3/1987 | Ossi | |
| 4,791,783 A | 12/1988 | Neitzel | |
| 4,916,894 A | 4/1990 | Adamson | |
| 5,209,428 A | 5/1993 | Bevilaqua | |
| 6,269,627 B1 | 8/2001 | Freese | |
| 6,270,037 B1 | 8/2001 | Freese | |
| 10,337,409 B2 | 7/2019 | Bedrine | |
| 10,876,411 B2 | 12/2020 | Ramirez | |
| 10,968,748 B2 | 4/2021 | Ramirez | |
| 11,073,160 B2 | 7/2021 | Murugan | |
| 2009/0139202 A1 | 6/2009 | Agrawal | |
| 2018/0156285 A1* | 6/2018 | Plante | F16D 37/02 |
| 2019/0145322 A1 | 5/2019 | Sellick | |
| 2020/0017229 A1 | 1/2020 | Steinert | |
| 2020/0182137 A1* | 6/2020 | Carr | F02B 39/12 |
| 2020/0224606 A1* | 7/2020 | Dierksmeier | F16H 48/22 |
| 2020/0400078 A1* | 12/2020 | Hanrahan | F16H 48/08 |
| 2023/0033330 A1* | 2/2023 | Pisani | B64C 27/14 |

FOREIGN PATENT DOCUMENTS

EP 3109437 A1 12/2016

OTHER PUBLICATIONS

EP Search Report for EP Patent Application No. 23195543.6 dated Feb. 8, 2024.

* cited by examiner

*Primary Examiner* — Yi-Kai Wang
(74) *Attorney, Agent, or Firm* — Getz Balich LLC

(57) ABSTRACT

An assembly is provided for an aircraft propulsion system. This assembly includes a compressor section, a combustor section, a turbine section and a flowpath extending sequentially through the compressor section, the combustor section and the turbine section. The assembly also includes a turbine rotor, a propulsor rotor and an auxiliary turbine. The turbine rotor is within the turbine section. The turbine rotor is configured to rotatably drive the propulsor rotor. The auxiliary turbine includes an auxiliary turbine rotor. The auxiliary turbine rotor is configured to rotatably drive the propulsor rotor with the turbine rotor. The auxiliary turbine is configured to receive bleed gas from the flowpath.

20 Claims, 8 Drawing Sheets

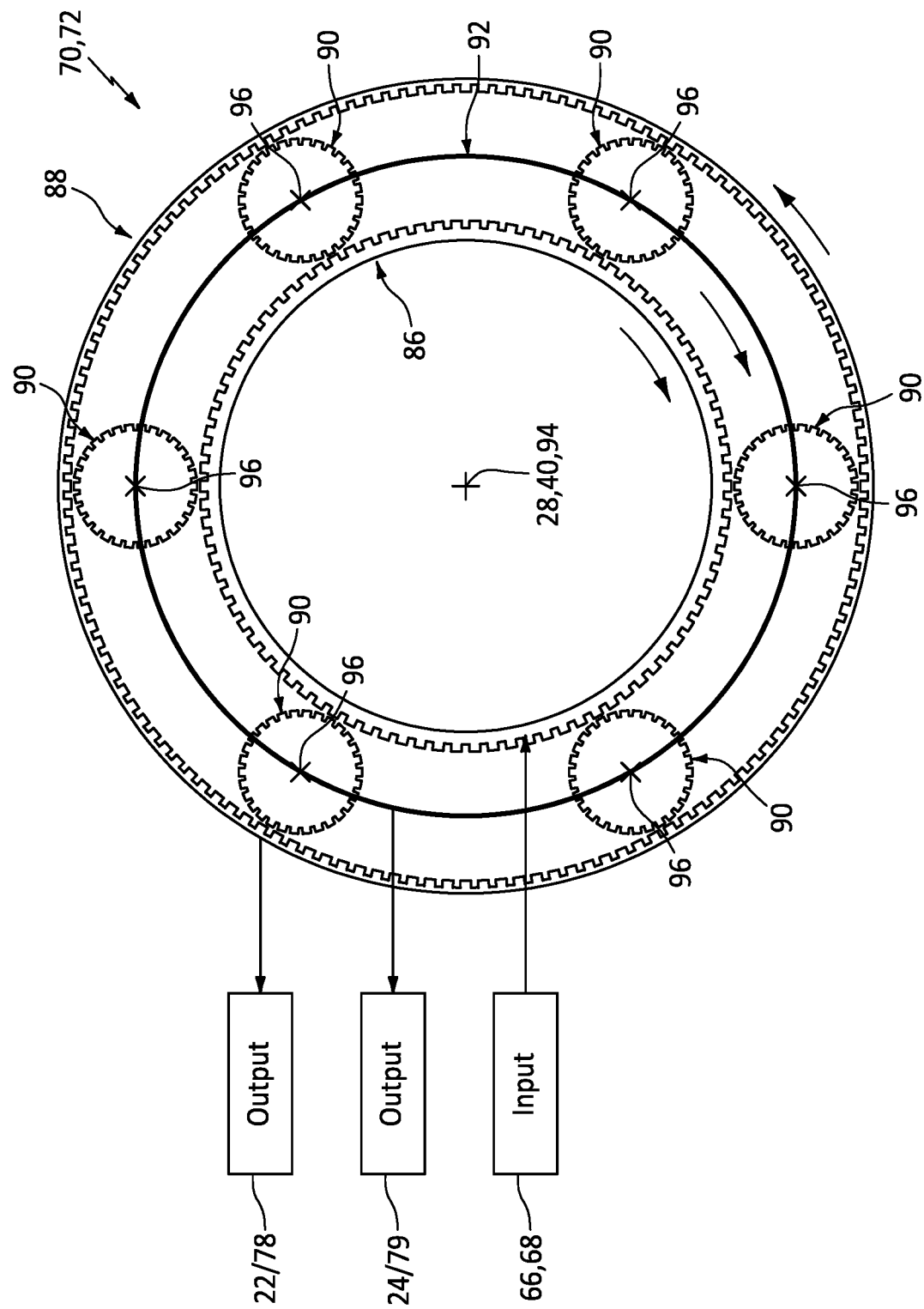

SELECTIVE POWER DISTRIBUTION FOR AN AIRCRAFT PROPULSION SYSTEM

BACKGROUND OF THE DISCLOSURE

1. Technical Field

This disclosure relates generally to an aircraft propulsion system and, more particularly, to power distribution between different rotors of the aircraft propulsion system.

2. Background Information

Various types and configurations of propulsion systems are known in the art for an aircraft. While these known aircraft propulsion systems have various benefits, there is still room in the art for improvement.

SUMMARY OF THE DISCLOSURE

According to an aspect of the present disclosure, an assembly is provided for an aircraft propulsion system. This assembly includes a compressor section, a combustor section, a turbine section and a flowpath extending sequentially through the compressor section, the combustor section and the turbine section. The assembly also includes a turbine rotor, a propulsor rotor and an auxiliary turbine. The turbine rotor is within the turbine section. The turbine rotor is configured to rotatably drive the propulsor rotor. The auxiliary turbine includes an auxiliary turbine rotor. The auxiliary turbine rotor is configured to rotatably drive the propulsor rotor with the turbine rotor. The auxiliary turbine is configured to receive bleed gas from the flowpath.

According to another aspect of the present disclosure, another assembly is provided for an aircraft propulsion system. This assembly includes a compressor section, a combustor section, a turbine section and a flowpath extending through the compressor section, the combustor section and the turbine section. The assembly also includes a turbine rotor, a propulsor rotor, an auxiliary turbine and a brake. The turbine rotor is within the turbine section. The turbine rotor is configured to rotatably drive the propulsor rotor. The auxiliary turbine includes an auxiliary turbine rotor. The auxiliary turbine rotor is configured to rotatably drive the propulsor rotor. The brake is configured to brake rotation of the propulsor rotor.

According to still another aspect of the present disclosure, another assembly is provided for an aircraft propulsion system. This assembly includes a compressor section, a combustor section, a turbine section and a flowpath extending through the compressor section, the combustor section and the turbine section. The assembly also includes a rotating structure, a geartrain, a first propulsor rotor, a second propulsor rotor and a control system. The rotating structure includes a turbine rotor within the turbine section. The geartrain is coupled to the rotating structure. The first propulsor rotor is coupled to the geartrain. The second propulsor rotor is coupled to the geartrain. The control system is configured to switch between a first mode and a second mode. The rotating structure is configured to drive rotation of the first propulsor rotor through the geartrain during the first mode. The rotating structure is configured to drive rotation of the second propulsor rotor through the geartrain during the second mode. The control system includes an air turbine and a brake.

The assembly may also include a second propulsor rotor, a second auxiliary turbine and a second brake. The turbine rotor is configured to rotatably drive the second propulsor rotor. The second auxiliary turbine includes a second auxiliary turbine rotor. The second auxiliary turbine rotor is configured to rotatably drive the second propulsor rotor. The second brake is configured to brake rotation of the second propulsor rotor. The second auxiliary turbine and the brake are configured to operate together to stop rotation of the propulsor rotor while the turbine rotor remains rotating. The auxiliary turbine and the second brake are configured to operate together to stop rotation of the second propulsor rotor while the turbine rotor remains rotating.

The assembly may also include a lock device configured to lock rotation of the propulsor rotor.

The auxiliary turbine may be configured to receive bleed gas from the flowpath and drive rotation of the propulsor rotor.

The auxiliary turbine may be configured to receive bleed air from the compressor section.

The compressor section may include a low pressure compressor section and a high pressure compressor section. The auxiliary turbine may be configured to receive bleed air from the high pressure compressor section.

The auxiliary turbine may be configured as or otherwise include an air turbine.

The auxiliary turbine may be configured to increase a rotational speed of the propulsor rotor.

The assembly may also include a brake configured to brake rotation of the propulsor rotor.

The brake may be configured as or otherwise include a disk brake.

The assembly may also include a lock device configured to lock rotation of the propulsor rotor.

The lock device may be configured as or otherwise include a splined coupling.

The assembly may also include a geartrain and a rotating structure. The rotating structure may include the turbine rotor. The rotating structure may be coupled to the propulsor rotor through the geartrain.

The assembly may also include a second propulsor rotor and a second auxiliary turbine. The second propulsor rotor may be coupled to the rotating structure through the geartrain. The turbine rotor may be configured to rotatably drive the second propulsor rotor. The second auxiliary turbine may include a second auxiliary turbine rotor. The second auxiliary turbine rotor may be configured to rotatably drive the second propulsor rotor with the turbine rotor.

The assembly may also include a brake configured to brake rotation of the second propulsor rotor.

During a transition from driving rotation of the second propulsor rotor to driving rotation of the propulsor rotor with the rotating structure, the brake may be configured to brake rotation of the second propulsor and the auxiliary turbine may be configured to speed up rotation of the propulsor rotor.

The assembly may also include a lock device configured to lock rotation of the second propulsor rotor.

A rotational axis of the propulsor rotor may be angularly offset from a rotational axis of the second propulsor rotor.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIGS. 2A-C are schematic illustrations of the geartrain coupled between an input and multiple outputs during various modes of operation.

DETAILED DESCRIPTION

Figure 1:
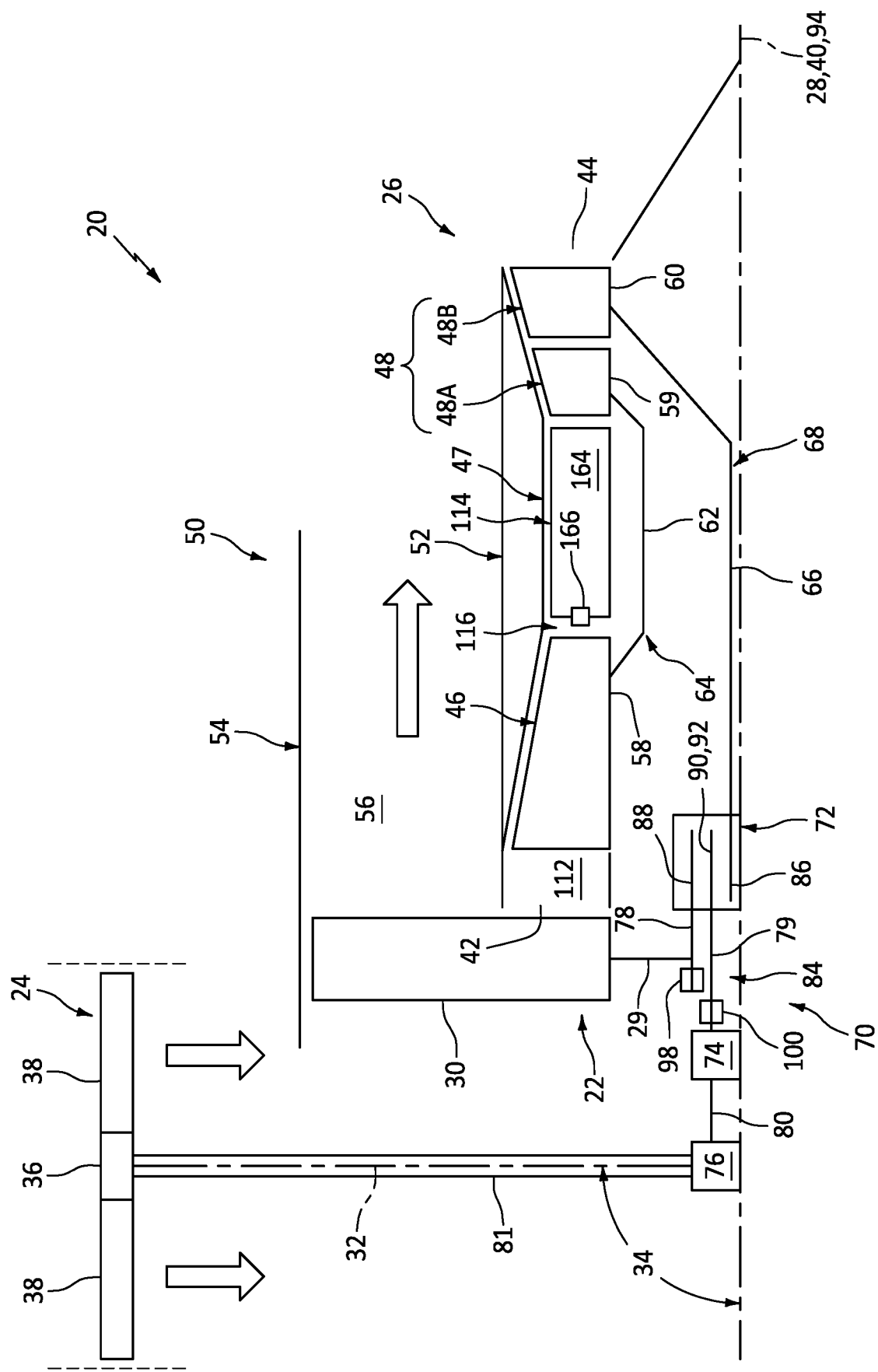
FIG. 1 is a partial, schematic illustration of an aircraft propulsion system.

FIG. 1 schematically illustrates a propulsion system 20 for an aircraft. The aircraft may be an airplane, a helicopter, a drone (e.g., an unmanned aerial vehicle (UAV)), a spacecraft or any other manned or unmanned aerial vehicle. This aircraft may be configured as a vertical take-off and landing (VTOL) aircraft or a short take-off and vertical landing (STOVL) aircraft. The aircraft propulsion system 20 of FIG. 1, for example, is configured to generate power for first direction propulsion (e.g., propulsive thrust) during a first mode of operation and to generate power for second direction propulsion (e.g., propulsive lift) during a second mode of operation, where the first direction is different than (e.g., angularly offset from) the second direction. The first mode may be a horizontal (e.g., forward) flight mode where the first direction propulsion is substantially horizontal (e.g., within 5 degrees, 10 degrees, etc. of a horizontal axis) propulsive thrust. The second mode may be a vertical flight and/or hover mode where the second direction propulsion is substantially vertical (e.g., within 5 degrees, 10 degrees, etc. of a vertical axis) propulsive lift. The aircraft propulsion system 20, of course, may also be configured to generate both the first direction (e.g., horizontal) propulsion and the second direction (e.g., vertical) propulsion during a third (e.g., transition) mode of operation. The aircraft propulsion system 20 of FIG. 1 includes at least one bladed first propulsor rotor 22, at least one bladed second propulsor rotor 24 and a gas turbine engine core 26 configured to rotatably drive the first propulsor rotor 22 and the second propulsor rotor 24.

The first propulsor rotor 22 may be configured as a ducted rotor such as a fan rotor. The first propulsor rotor 22 of FIG. 1 is rotatable about a first rotor axis 28. This first rotor axis 28 is an axial centerline of the first propulsor rotor 22 and may be horizontal when the aircraft is on ground. The first propulsor rotor 22 includes at least a first rotor disk 29 and a plurality of first rotor blades 30 (on visible in FIG. 1); e.g., fan blades. The first rotor blades 30 are distributed circumferentially around the first rotor disk 29 in an annular array. Each of the first rotor blades 30 is connected to and projects radially (relative to the first rotor axis 28) out from the first rotor disk 29.

The second propulsor rotor 24 may be configured as an open rotor such as a propeller rotor or a helicopter (e.g., main) rotor. Of course, in other embodiments, the second propulsor rotor 24 may alternatively be configured as a ducted rotor such as a fan rotor; e.g., see dashed line duct. The second propulsor rotor 24 of FIG. 1 is rotatable about a second rotor axis 32. This second rotor axis 32 is an axial centerline of the second propulsor rotor 24 and may be vertical when the aircraft is on the ground. The second rotor axis 32 is angularly offset from the first rotor axis 28 by an included angle 34; e.g., an acute angle or a right angle. This included angle 34 may be between sixty degrees (60°) and ninety degrees (90°); however, the present disclosure is not limited to such an exemplary relationship. The second propulsor rotor 24 includes at least a second rotor disk 36 and a plurality of second rotor blades 38; e.g., open rotor blades. The second rotor blades 38 are distributed circumferentially around the second rotor disk 36 in an annular array. Each of the second rotor blades 38 is connected to and projects radially (relative to the second rotor axis 32) out from the second rotor disk 36.

The engine core 26 extends axially along a core axis 40 between a forward, upstream airflow inlet 42 and an aft, downstream exhaust 44. The core axis 40 may be an axial centerline of the engine core 26 and may be horizontal when the aircraft is on the ground. This core axis 40 may be parallel (e.g., coaxial) with the first rotor axis 28 and, thus, angularly offset from the second rotor axis 32. The engine core 26 of FIG. 1 includes a compressor section 46, a combustor section 47 and a turbine section 48. The turbine section 48 of FIG. 1 includes a high pressure turbine (HPT) section 48A and a low pressure turbine (LPT) section 48B (also sometimes referred to as a power turbine section).

The engine sections 46-48B are arranged sequentially along the core axis 40 within an engine housing 50. This engine housing 50 includes an inner case 52 (e.g., a core case) and an outer case 54 (e.g., a fan case). The inner case 52 may house one or more of the engine sections 46-48B; e.g., the engine core 26. The outer case 54 may house the first propulsor rotor 22. The outer case 54 of FIG. 1 also axially overlaps and extends circumferentially about (e.g., completely around) the inner case 52 thereby at least partially forming a bypass flowpath 56 radially between the inner case 52 and the outer case 54.

Each of the engine sections 46, 48A and 48B includes a bladed rotor 58-60 within that respective engine section 46, 48A, 48B. Each of these bladed rotors 58-60 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The compressor rotor 58 is connected to the HPT rotor 59 through a high speed shaft 62. At least (or only) these engine components 58, 59 and 62 collectively form a high speed rotating structure 64. This high speed rotating structure 64 is rotatable about the core axis 40. The LPT rotor 60 is connected to a low speed shaft 66. At least (or only) these engine components collectively form a low speed rotating structure 68. This low speed rotating structure 68 is rotatable about the core axis 40. The low speed rotating structure 68 and, more particularly, its low speed shaft 66 may project axially through a bore of the high speed rotating structure 64 and its high speed shaft 62.

The aircraft propulsion system 20 of FIG. 1 includes a powertrain 70 that couples the low speed rotating structure 68 to the first propulsor rotor 22 and that couples the low speed rotating structure 68 to the second propulsor rotor 24. The powertrain 70 of FIG. 1 includes a geartrain 72, a transmission 74, a gearing 76 (e.g., bevel gearing) and one or more shafts 78-81 and/or other torque transmission devices for coupling the geartrain 72 to the first propulsor rotor 22 and the second propulsor rotor 24. The powertrain 70 of FIG. 1 also includes a propulsion control system 84.

Figure 2A:
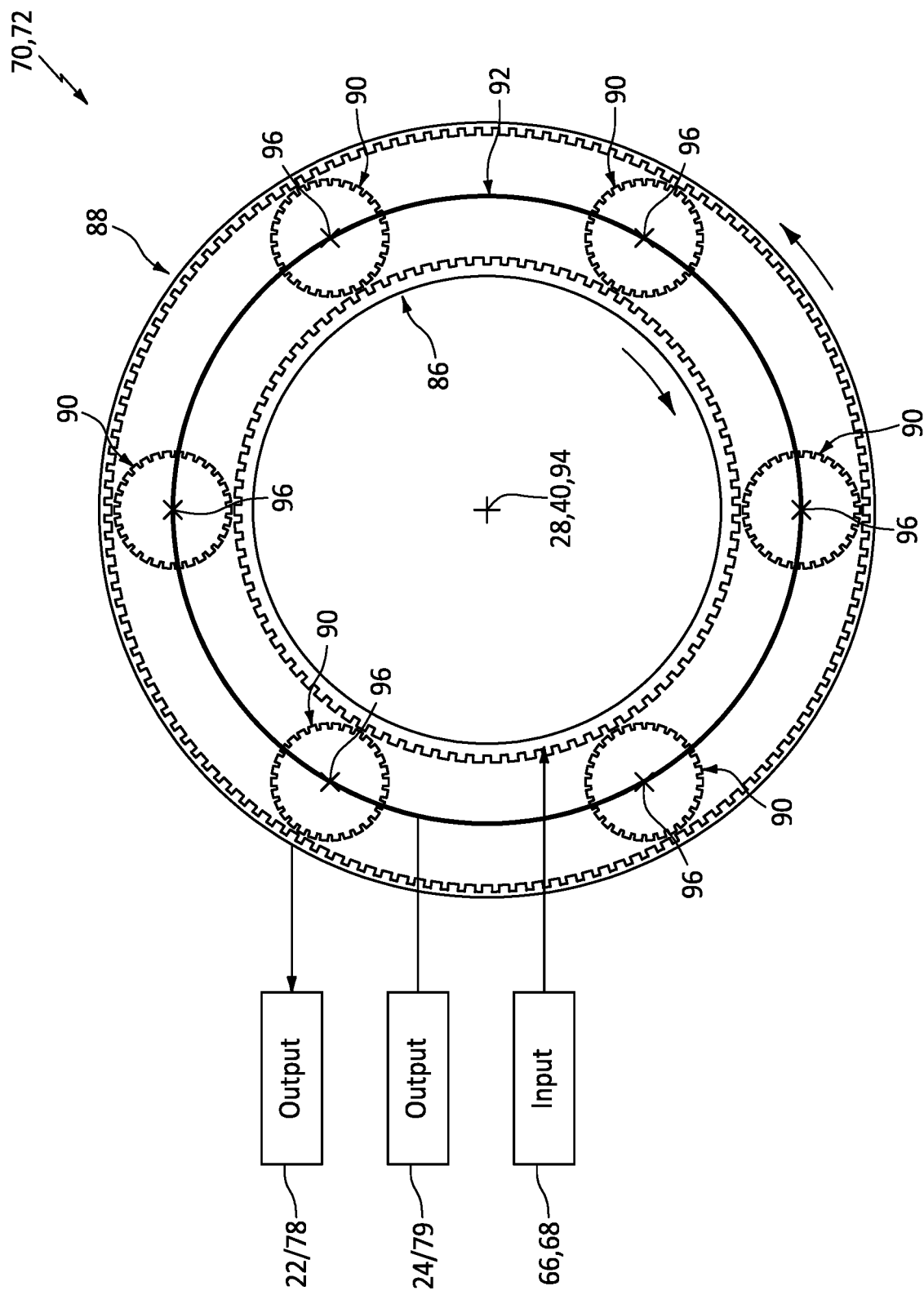
Figure 2B:
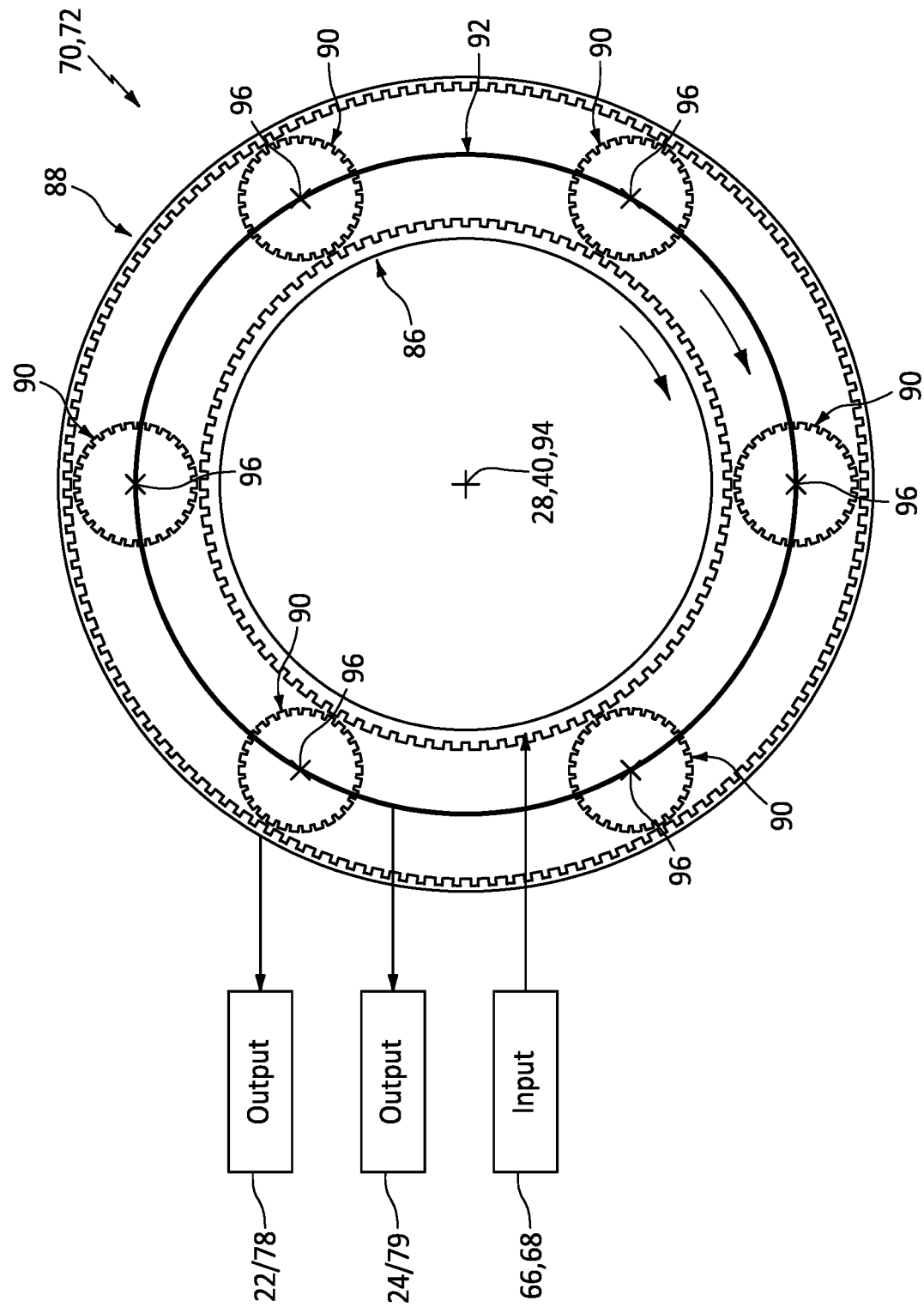

Referring to FIGS. 2A-C, the geartrain 72 may be operable as a star gear system during a star mode of operation; e.g., see FIG. 2A. The geartrain 72 may be operable as a planetary gear system during a planetary mode of operation;

e.g., see FIG. 2B. The geartrain 72 may be operable as an open gear system during an open mode of operation; e.g., see FIG. 2C.

The geartrain 72 of FIGS. 2A-C includes a sun gear 86 (e.g., an inner gear), a ring gear 88 (e.g., an outer gear), one or more intermediate gears 90 (e.g., planet or star gears) and a gear carrier 92. The sun gear 86 is rotatable about a centerline axis 94 of the geartrain 72, which centerline axis 94 may be parallel (e.g., coaxial) with the axis 28, 40. The ring gear 88 is rotatable about the centerline axis 94 during the star mode of operation (see FIG. 2A) and the open mode of operation (see FIG. 2C). This ring gear 88 extends circumferentially around (e.g., circumscribes) the sun gear 86 and an annular array of the intermediate gears 90. The intermediate gears 90 are arranged circumferentially about the centerline axis 94 in the annular array. Each of the intermediate gears 90 is radially between and meshed with the sun gear 86 and the ring gear 88. Each of the intermediate gears 90 is rotatable about a respective intermediate gear axis 96, and is rotatably mounted to and supported by the carrier 92. The carrier 92 is rotatable about the centerline axis 94 during the planetary system mode of operation (see FIG. 2B) and the open mode of operation (see FIG. 2C).

Referring to FIG. 1, the sun gear 86 is coupled to the low speed rotating structure 68 and its low speed shaft 66, where the low speed shaft 66 provides a power input for the geartrain 72. The ring gear 88 is coupled to the first propulsor rotor 22 through the first propulsor shaft 78, where the first propulsor shaft 78 provides a first power output from the geartrain 72. The carrier 92 and, thus, the first intermediate gears 90 are coupled to the second propulsor rotor 24 through the system elements 74, 76 and 79-81, where the geartrain output shaft 79 provides a second power output from the geartrain 72. More particularly, the carrier 92 is coupled to the transmission 74 through the geartrain output shaft 79; although, the carrier 92 is stationary during the first mode as described below in further detail.

An output of the transmission 74 is connected to the gearing 76 through the transmission output shaft 80. This transmission 74 may be configured to selectively couple (e.g., transfer mechanical power between) the geartrain output shaft 79 and the transmission output shaft 80. During the first mode of operation, for example, the transmission 74 may be configured to decouple the geartrain output shaft 79 from the transmission output shaft 80, thereby decoupling the low speed rotating structure from the second propulsor rotor 24. During the second mode of operation (and the third mode of operation), the transmission 74 may be configured to couple the geartrain output shaft 79 with the transmission output shaft 80, thereby coupling the low speed rotating structure 68 with the second propulsor rotor 24. The transmission 74 may be configured as a clutched or clutchless transmission.

An output of the gearing 76 is connected to the second propulsor rotor 24 through the second propulsor shaft 81. This gearing 76 provides a coupling between the transmission output shaft 80 rotating about the axis 28, 40, 94 and the second propulsor shaft 81 rotating about the second rotor axis 32. The gearing 76 may also provide a speed change mechanism between the transmission output shaft 80 and the second propulsor shaft 81. The gearing 76, however, may alternatively provide a 1:1 rotational coupling between the transmission output shaft 80 and the second propulsor shaft 81 such that the transmission output shaft 80 and the second propulsor shaft 81 rotate at a common (e.g., the same) rotational speed. Furthermore, in some embodiments, the gearing 76 and the transmission output shaft 80 may be omitted where the functionality of the gearing 76 is integrated into the transmission 74. In still other embodiments, the transmission 74 may be omitted where decoupling of the second propulsor rotor 24 is not required and/or where an optional additional speed change between the carrier 92 and the second propulsor rotor 24 is not required.

The propulsion control system 84 includes one or more rotation controls 98 and 100. The first rotation control 98 of FIG. 1 is configured for the first propulsor rotor 22. The second rotation control 100 of FIG. 1 is configured for the second propulsor rotor 24.

Figure 3A:
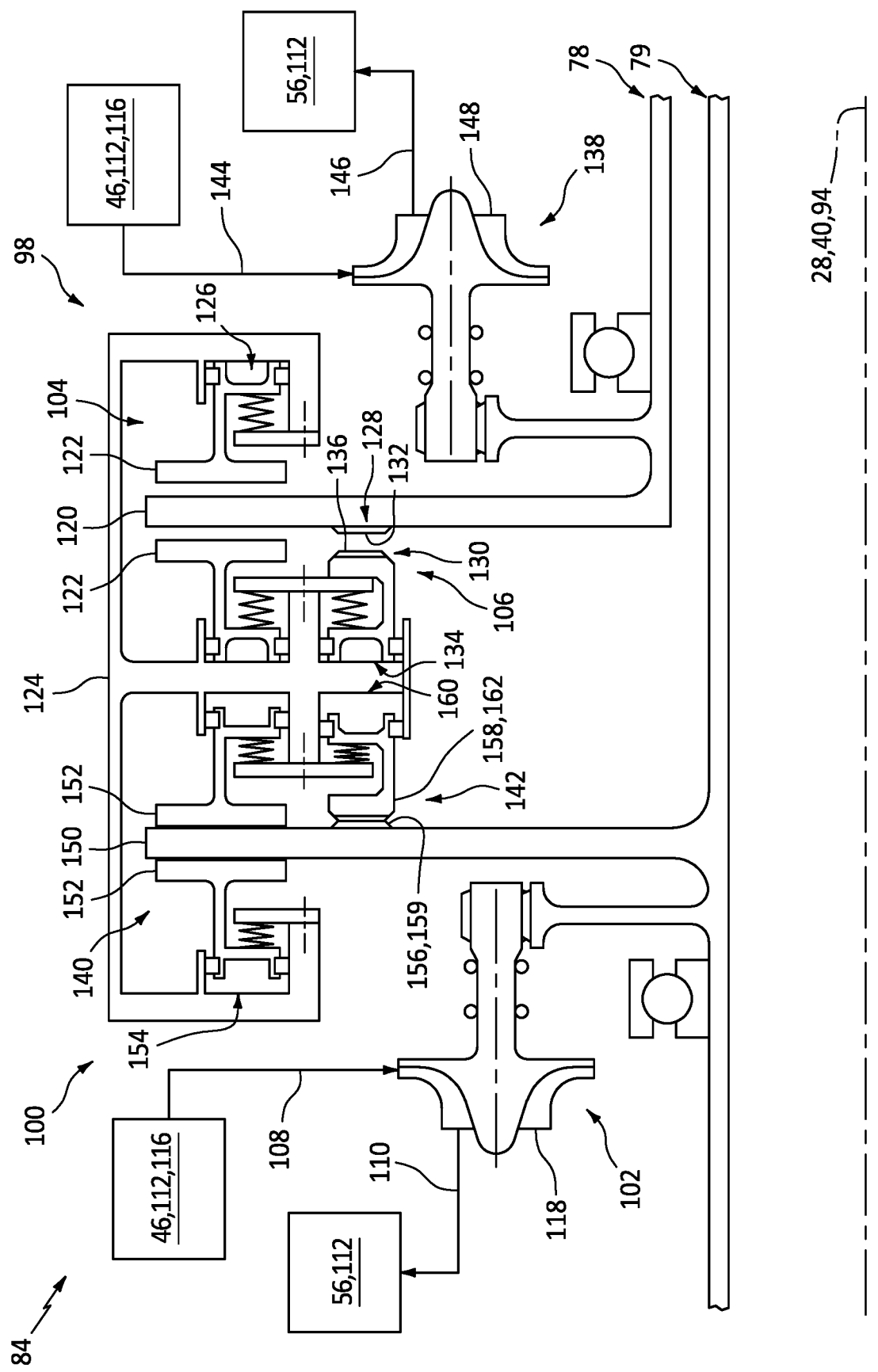
FIGS. 3A and 3B are partial sectional illustrations of a propulsion control system during various modes of operation.
Figure 3B:
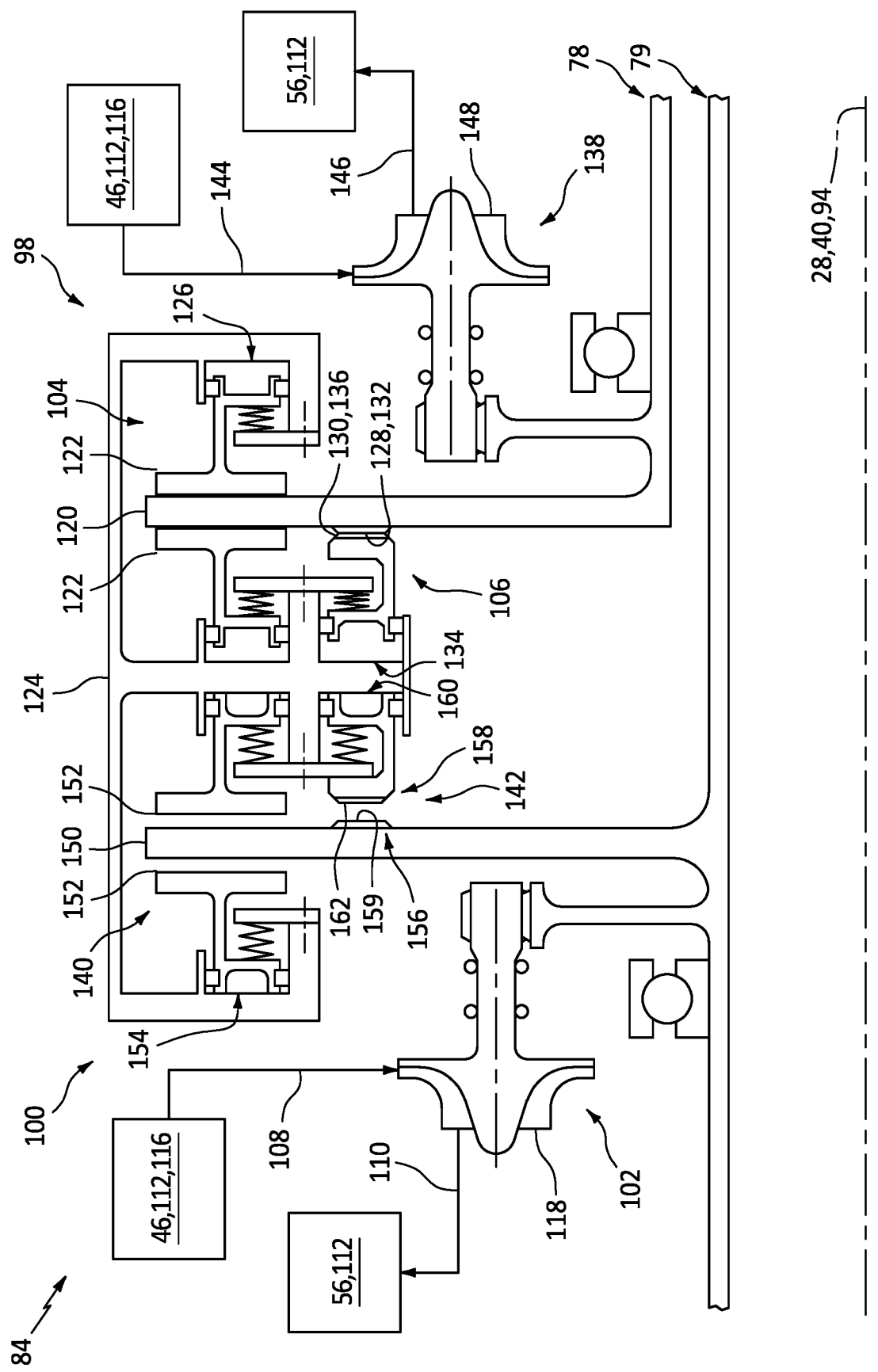

Referring to FIGS. 3A and 3B, the first rotation control 98 includes one or more devices for influencing a rotational speed of the first propulsor rotor 22 (see FIG. 1), for example, during the third mode of operation (see FIG. 2C). The first rotation control 98 of FIGS. 3A and 3B, for example, includes a first auxiliary turbine 102 and a first brake 104; however, the first auxiliary turbine 102 or the first brake 104 may be omitted in other embodiments. The first rotation control 98 may also include a first lock device 106 configured to selectively lock (e.g., fix, prevent) rotation of the first propulsor rotor 22 (see FIG. 1) following the stopping of first propulsor rotor rotation by the first auxiliary turbine 102 and/or the first brake 104 to enter, for example, the second mode of operation.

The first auxiliary turbine 102 may be (e.g., indirectly) coupled to the first propulsor rotor 22 (see FIG. 1) through the geartrain 72. The first auxiliary turbine 102 of FIGS. 3A and 3B, for example, is coupled to the geartrain output shaft 79. The first auxiliary turbine 102, however, may alternatively be coupled to the geartrain output shaft 79 through a geartrain (and/or other power transmission device(s)) such that the first auxiliary turbine 102 may reside remote from the geartrain output shaft 79; for example, mounted to the inner case 52 or the outer case 54 of FIG. 1.

The first auxiliary turbine 102 may be configured as an air turbine, a free turbine or any other type of turbine powered by (e.g., driven by) gas bled from the engine core 26 (see FIG. 1). The aircraft propulsion system 20 of FIGS. 3A and 3B, for example, includes a first bleed circuit 108 and a first exhaust circuit 110 for the first auxiliary turbine 102. The first bleed circuit 108 is configured to bleed gas (e.g., compressed air) from a core flowpath 112 of the engine core 26, and provide the bleed gas (e.g., the bleed air) to an inlet of the first auxiliary turbine 102. The first bleed circuit 108 may bleed the gas from the compressor section 46 (or alternatively another section of the engine core 26). The first bleed circuit 108, in particular, may be configured to bleed the gas at a location along the core flowpath 112 between the compressor section 46 and a (e.g., annular) combustor 114 within the combustion section 47; e.g., from a diffuser 116 between the compressor section 46 and the combustor 114. The first exhaust circuit 110 is configured to receive expanded bleed gas from an outlet (e.g., an exhaust) of the first auxiliary turbine 102, and direct that exhausted bleed gas into a flowpath of the aircraft propulsion system (e.g., the bypass flowpath 56 or the core flowpath 112). Alternatively, the first exhaust circuit 110 may direct the exhausted bleed gas directly into an environment outside of the aircraft propulsion system 20. The present disclosure, however, is not limited to the foregoing exemplary bleed circuit and/or exhaust circuit configurations.

The first auxiliary turbine 102 of FIGS. 3A and 3B includes a bladed first auxiliary turbine rotor 118. This first auxiliary turbine rotor 118 includes a plurality of turbine blades arranged circumferentially around and connected to one or more respective rotor disks. The turbine rotor blades, for example, may be formed integral with or mechanically fastened, welded, brazed, adhered and/or otherwise attached to the respective rotor disk(s). The first auxiliary turbine 102 may be configured as an axial flow reaction turbine, a radial flow reaction turbine or an impulse turbine, and the first auxiliary turbine 102 may include one or more stages; e.g., rows/arrays of its turbine blades.

The first auxiliary turbine 102 and its first auxiliary turbine rotor 118 are configured to drive rotation of the geartrain output shaft 79 and, thus, the second propulsor rotor 24 in a common direction with the low speed rotating structure 68 and its LPT rotor 60 (see FIG. 1). For example, if the low speed rotating structure 68 and its LPT rotor 60 of FIG. 1 are configured to drive rotation of the second propulsor rotor 24 clockwise about the axis 32 (see FIG. 1) to generate second direction propulsive thrust, then the first auxiliary turbine 102 and its first auxiliary turbine rotor 118 (see FIGS. 3A and 3B) may be configured to also drive rotation of the second propulsor rotor 24 clockwise about the axis 32. The first auxiliary turbine 102 and its first auxiliary turbine rotor 118 may thereby speed up rotation of the geartrain output shaft 79 and, thus, the second propulsor rotor 24. When paired with engaging/activating the first brake 104 as described below and with the open differential of FIG. 2C, the speeding up of the geartrain output shaft 79 may in turn drive rotation of the first propulsor rotor 22 down towards or to a zero rotational speed about the axis 28, 40, 94.

The first brake 104 of FIGS. 3A and 3B is configured to brake (e.g., slow and/or stop) rotation of the first propulsor rotor 22 (see FIG. 1) to enter the second mode of operation. The first brake 104 of FIGS. 3A and 3B, for example, is arranged with the first propulsor shaft 78. This first brake 104 may be configured as or otherwise include a disk brake. The first brake 104 of FIGS. 3A and 3B, for example, includes a first brake rotor 120 and one or more first brake pads 122. The first brake rotor 120 is connected to and rotatable with the first propulsor shaft 78; or another rotating element (directly or indirectly) rotatable with the first propulsor rotor 22 of FIG. 1. The first brake pads 122 are anchored to a stationary structure 124, which may be part of the engine housing 50 and/or an airframe of the aircraft. The first brake pads 122 may be actuated by a first brake actuator 126 (e.g., a hydraulic brake actuator) to move the first brake pads 122 from an open position (see FIG. 3A) to a closed position (see FIG. 3B). In the open position of FIG. 3A, the first brake pads 122 are spaced from and do not engage (e.g., contact) the first brake rotor 120. In the closed position of FIG. 3B, the first brake pads 122 engage (e.g., contact) and clamp onto the first brake rotor 120. Frictional rubbing between the first brake pads 122 and the first brake rotor 120 is operable to brake rotation of the first brake rotor 120 and, thus, the first propulsor shaft 78 (or another rotating element) connected thereto.

The first rotation control 98 may operate the first auxiliary turbine 102 and the first brake 104 concurrently or otherwise together to speed up rotation of the second propulsor rotor 24 and slow and/or stop the rotation of the first propulsor rotor 22 (see FIG. 1). Using the first auxiliary turbine 102 and the first brake 104 together may facilitate a reduction in size and/or stopping power of the first auxiliary turbine 102 and the first brake 104 than if the first auxiliary turbine 102 or the first brake 104 was employed alone. However, in other embodiments, the first auxiliary turbine 102 and/or the first brake 104 may be discretely (e.g., separately) used to slow and/or stop the rotation of the first propulsor rotor 22 (see FIG. 1); e.g., where the first propulsor rotor 22 is rotating at a relatively slow speed.

The first lock device 106 of FIGS. 3A and 3B includes a (e.g., annular) first splined rotating element 128 and a (e.g., annular) first splined stationary element 130. The first splined rotating element 128 is rotatable with the first propulsor shaft 78 and, thus, the first propulsor rotor 22 (see FIG. 1). The first splined rotating element 128 of FIGS. 3A and 3B, for example, is formed integral with (or otherwise attached to) the first brake rotor 120; e.g., radially below/inside the first brake pads 122. This first splined rotating element 128 includes a plurality of first rotating element splines 132 arranged in an array about the axis 28, 40, 94.

The first splined stationary element 130 may be configured as a translating element. The first splined stationary element 130, for example, is rotationally fixed to the stationary structure 124. The first splined stationary element 130, however, is axially translatable along the axis 28, 40, 94 between an unlocked position (see FIG. 3A) and a locked position (see FIG. 3B). The first splined stationary element 130, for example, may be translated using a first lock actuator 134; e.g., a hydraulic brake actuator. The first splined stationary element 130 includes a plurality of first stationary element splines 136 arranged in an array about the axis 28, 40, 94.

In the locked position of FIG. 3B, the first splined stationary element 130 radially overlaps and is axially adjacent (e.g., abutted against) the first splined rotating element 128. The first stationary element splines 136 engage (e.g., mesh with) the first rotating element splines 132. With this arrangement, the first lock device 106 is operable to lock rotation of the first propulsor rotor 22, without affecting (e.g., permitting) rotation of the second propulsor rotor 24. By contrast, in the unlocked position of FIG. 3A, the first stationary element splines 136 are disengaged (e.g., axially spaced) from the first rotating element splines 132. With this arrangement, the first lock device 106 is operable to facilitate (e.g., permit) rotation of the first propulsor rotor 22; although, the second propulsor rotor 24 may be rotationally locked as described below in further detail.

Referring to FIGS. 3A and 3B, the second rotation control 100 includes one or more devices for influencing a rotational speed of the second propulsor rotor 24 (see FIG. 1), for example, during the third mode of operation (see FIG. 2C). The second rotation control 100 of FIGS. 3A and 3B, for example, includes a second auxiliary turbine 138 and a second brake 140; however, the second auxiliary turbine 138 or the second brake 140 may be omitted in other embodiments. The second rotation control 100 may also include a second lock device 142 configured to selectively lock (e.g., fix, prevent) rotation of the second propulsor rotor 24 (see FIG. 1) following the stopping of second propulsor rotor rotation by the second auxiliary turbine 138 and/or the second brake 140 to enter, for example, the first mode of operation.

The second auxiliary turbine 138 may be (e.g., indirectly) coupled to the second propulsor rotor 24 (see FIG. 1) through the geartrain 72. The second auxiliary turbine 138 of FIGS. 3A and 3B, for example, is coupled to the first propulsor shaft 78. The second auxiliary turbine 138, however, may alternatively be coupled to the first propulsor shaft 78 through a geartrain (and/or other power transmission device(s)) such that the second auxiliary turbine 138 may reside remote from the first propulsor shaft 78; for example, mounted to the inner case 52 or the outer case 54 of FIG. 1.

The second auxiliary turbine 138 may be configured as an air turbine, a free turbine or any other type of turbine powered by (e.g., driven by) gas bled from the engine core 26. The aircraft propulsion system 20 of FIGS. 3A and 3B, for example, includes a second bleed circuit 144 and a second exhaust circuit 146 for the second auxiliary turbine 138. The second bleed circuit 144 is configured to bleed gas (e.g., compressed air) from the core flowpath 112, and provide the bleed gas (e.g., the bleed air) to an inlet of the second auxiliary turbine 138. The second bleed circuit 144 may bleed the gas from the compressor section 46 (or alternatively another section of the engine core 26). The second bleed circuit 144, in particular, may be configured to bleed the gas at a location along the core flowpath 112 between the compressor section 46 and the combustor 114 within the combustion section 47; e.g., from the diffuser 116 between the compressor section 46 and the combustor 114. The second exhaust circuit 146 is configured to receive expanded bleed gas from an outlet (e.g., an exhaust) of the second auxiliary turbine 138, and direct that exhausted bleed gas into a flowpath of the aircraft propulsion system (e.g., the bypass flowpath 56 or the core flowpath 112). Alternatively, the second exhaust circuit 146 may direct the exhausted bleed gas directly into the outside environment. The present disclosure, however, is not limited to the foregoing exemplary bleed circuit and/or exhaust circuit configurations.

The second auxiliary turbine 138 of FIGS. 3A and 3B includes a bladed second auxiliary turbine rotor 148. This second auxiliary turbine rotor 148 includes a plurality of turbine blades arranged circumferentially around and connected to one or more respective rotor disks. The turbine rotor blades, for example, may be formed integral with or mechanically fastened, welded, brazed, adhered and/or otherwise attached to the respective rotor disk(s). The second auxiliary turbine 138 may be configured as an axial flow reaction turbine, a radial flow reaction turbine or an impulse turbine, and the second auxiliary turbine 138 may include one or more stages; e.g., rows/arrays of its turbine blades.

The second auxiliary turbine 138 and its second auxiliary turbine rotor 148 are configured to drive rotation of the first propulsor shaft 78 and, thus, the first propulsor rotor 22 in a common direction with the low speed rotating structure 68 and its LPT rotor 60 (see FIG. 1). For example, if the low speed rotating structure 68 and its LPT rotor 60 of FIG. 1 are configured to drive rotation of the first propulsor rotor 22 clockwise about the axis 28, 40, 94 to generate first direction propulsive thrust, then the second auxiliary turbine 138 and its second auxiliary turbine rotor 148 (see FIGS. 3A and 3B) may be configured to also drive rotation of the first propulsor rotor 22 clockwise about the axis 28, 40, 94. The second auxiliary turbine 138 and its second auxiliary turbine rotor 148 may thereby speed up rotation of the first propulsor rotor 22. When paired with engaging/activating the second brake 140 as described below and with the open differential of FIG. 2C, the speeding up of the first propulsor shaft 78 may in turn drive rotation of the second propulsor rotor 24 down towards or to a zero rotational speed about the axis 32.

The second brake 140 of FIGS. 3A and 3B is configured to brake (e.g., slow and/or stop) rotation of the second propulsor rotor 24 (see FIG. 1) to enter the second mode of operation. The second brake 140 of FIGS. 3A and 3B, for example, is arranged with the geartrain output shaft 79. This second brake 140 may be configured as or otherwise include a disk brake. The second brake 140 of FIGS. 3A and 3B, for example, includes a second brake rotor 150 and one or more second brake pads 152. The second brake rotor 150 is connected to and rotatable with the geartrain output shaft 79; or another rotating element (directly or indirectly) rotatable with the second propulsor rotor 24 of FIG. 1. The second brake pads 152 are anchored to the stationary structure 124, which may be part of the engine housing 50 and/or the aircraft airframe. The second brake pads 152 may be actuated by a second brake actuator 154 (e.g., a hydraulic brake actuator) to move the second brake pads 152 from an open position (see FIG. 3B) to a closed position (see FIG. 3A). In the open position of FIG. 3B, the second brake pads 152 are spaced from and do not engage (e.g., contact) the second brake rotor 150. In the closed position of FIG. 3A, the second brake pads 152 engage (e.g., contact) and clamp onto the second brake rotor 150. Frictional rubbing between the second brake pads 152 and the second brake rotor 150 is operable to brake rotation of the second brake rotor 150 and, thus, the geartrain output shaft 79 (or another rotating element) connected thereto.

The second rotation control 100 may operate the second auxiliary turbine 138 and the second brake 140 concurrently or otherwise together to speed up rotation of the first propulsor rotor 22 and slow and/or stop the rotation of the second propulsor rotor 24 (see FIG. 1). Using the second auxiliary turbine 138 and the second brake 140 together may facilitate a reduction in size and/or stopping power of the second auxiliary turbine 138 and the second brake 140 than if the second auxiliary turbine 138 or the second brake 140 was employed alone. However, in other embodiments, the second auxiliary turbine 138 and/or the second brake 140 may be discretely (e.g., separately) used to slow and/or stop the rotation of the second propulsor rotor 24 (see FIG. 1); e.g., where the second propulsor rotor 24 is rotating at a relatively slow speed.

The second lock device 142 of FIGS. 3A and 3B includes a (e.g., annular) second splined rotating element 156 and a (e.g., annular) second splined stationary element 158. The second splined rotating element 156 is rotatable with the geartrain output shaft 79 and, thus, the second propulsor rotor 24 (see FIG. 1). The second splined rotating element 156 of FIGS. 3A and 3B, for example, is formed integral with (or otherwise attached to) the second brake rotor 150; e.g., radially below/inside the second brake pads 152. This second splined rotating element 156 includes a plurality of second rotating element splines 159 arranged in an array about the axis 28, 40, 94.

The second splined stationary element 158 may be configured as a translating element. The second splined stationary element 158, for example, is rotationally fixed to the stationary structure 124. The second splined stationary element 158, however, is axially translatable along the axis 28, 40, 94 between an unlocked position (see FIG. 3B) and a locked position (see FIG. 3A). The second splined stationary element 158, for example, may be translated using a second lock actuator 160; e.g., a hydraulic brake actuator. The second splined stationary element 158 includes a plurality of second stationary element splines 162 arranged in an array about the axis 28, 40, 94.

In the locked position of FIG. 3A, the second splined stationary element 158 radially overlaps and is axially adjacent (e.g., abutted against) the second splined rotating element 156. The second stationary element splines 162 engage (e.g., mesh with) the second rotating element splines 159. With this arrangement, the second lock device 142 is operable to lock rotation of the second propulsor rotor 24, without affecting (e.g., permitting) rotation of the first propulsor rotor 22. By contrast, in the unlocked position of FIG. 3B, the second stationary element splines 162 are disengaged (e.g., axially spaced) from the second rotating element splines 159. With this arrangement, the second lock device 142 is operable to facilitate (e.g., permit) rotation of the second propulsor rotor 24; although, the first propulsor rotor 22 may be rotationally locked as described above.

Referring to FIG. 1, during operation of the aircraft propulsion system 20, air enters the engine core 26 through the airflow inlet 42. This air is directed into the core flowpath 112, which core flowpath 112 which extends sequentially through the compressor section 46, the combustor section 47, the HPT section 48A and the LPT section 48B to the exhaust 44. The air within this core flowpath 112 may be referred to as core air.

The core air is compressed by the compressor rotor 58 and directed into a (e.g., annular) combustion chamber 164 of the combustor 114 in the combustor section 47. Fuel is injected into the combustion chamber 164 through one or more fuel injectors 166 (one visible in FIG. 1) and mixed with the compressed core air to provide a fuel-air mixture. This fuel-air mixture is ignited and combustion products thereof flow through and sequentially cause the HPT rotor 59 and the LPT rotor 60 to rotate. The rotation of the HPT rotor 59 drives rotation of the high speed rotating structure 64 and its compressor rotor 58. The rotation of the LPT rotor 60 drives rotation of the low speed rotating structure 68. The rotation of the low speed rotating structure 68 may drive rotation of the first propulsor rotor 22 through the geartrain 72 during, for example, the first and the third modes of operation. The rotation of the low speed rotating structure 68 may also drive rotation of the second propulsor rotor 24 through the geartrain 72 during, for example, the second and the third modes of operation. The first propulsor rotor 22, however, may be stationary during the second mode of operation. The second propulsor rotor 24 may be stationary during the first mode of operation.

Referring to FIGS. 1 and 3A, during the first mode of operation, the first splined stationary element 130 is disengaged from the first splined rotating element 128. The first lock device 106 is thereby disengaged and permits rotation of the first propulsor rotor 22. The second splined stationary element 158, by contrast, engages the second splined rotating element 156. The second lock device 142 thereby rotationally fixes (e.g., prevents rotation of) the second propulsor rotor 24. With this arrangement, the aircraft propulsion system 20 may generate the first direction propulsive thrust without also generating the second direction propulsive thrust. The geartrain 72 may thereby transfer all power received from the low speed rotating structure 68 to the first propulsor rotor 22.

To enter this first mode of operation while the second propulsor rotor 24 is rotating about the second rotor axis 32, the second brake 140 may be engaged to brake rotation of the second propulsor rotor 24. The second auxiliary turbine 138 may also or alternatively be activated to speed up a rotational speed of the first propulsor rotor 22. The braking of the second propulsor rotor 24 paired with the speeding up of the first propulsor rotor 22 and the open differential of FIG. 2C may drive a rotational speed of and thereby brake (e.g., slow) the second propulsor rotor 24. Once the second propulsor rotor 24 is braked to a zero rotational velocity about the second rotor axis 32, the second lock device 142 may be engaged as described above to fix rotation of the second propulsor rotor 24. The second brake 140 may subsequently be released. By contrast, to leave the first mode of operation and permit rotation of the second propulsor rotor 24 about the second rotor axis 32, the second lock device 142 may be disengaged to its open position of FIG. 3B.

Referring to FIGS. 1 and 3B, during the second mode of operation, the first splined stationary element 130 engages the first splined rotating element 128. The first lock device 106 thereby rotationally fixes (e.g., prevents rotation of) the first propulsor rotor 22. The second splined stationary element 158, by contrast, is disengaged from the second splined rotating element 156. The second lock device 142 is thereby disengaged and permits rotation of the second propulsor rotor 24. With this arrangement, the aircraft propulsion system 20 may generate the second direction propulsive thrust without also generating the first direction propulsive thrust. The geartrain 72 may thereby transfer all power received from the low speed rotating structure 68 to the second propulsor rotor 24.

To enter this second mode of operation while the first propulsor rotor 22 is rotating about the axis 28, 40, 94, the first brake 104 may be engaged to brake rotation of the first propulsor rotor 22. The first auxiliary turbine 102 may also or alternatively be activated to speed up a rotational speed of the second propulsor rotor 24. The braking of the first propulsor rotor 22 paired with the speeding up of the second propulsor rotor 24 and the open differential of FIG. 2C may drive a rotational speed of and thereby brake the first propulsor rotor 22. Once the first propulsor rotor 22 is braked to a zero rotational velocity about the axis 28, 40, 94, the first lock device 106 may be engaged as described above to fix rotation of the first propulsor rotor 22. The first brake 104 may subsequently be released. By contrast, to leave the second mode of operation and permit rotation of the first propulsor rotor 22 about the axis 28, 40, 94, the first lock device 106 may be disengaged to its open position of FIG. 3A.

During the third mode of operation, the first splined stationary element 130 of FIG. 3A is disengaged from the first splined rotating element 128. The first lock device 106 is thereby disengaged and permits rotation of the first propulsor rotor 22 of FIG. 1. In addition, the second splined stationary element 158 of FIG. 3B is disengaged from the second splined rotating element 156. The second lock device 142 is thereby disengaged and permits rotation of the second propulsor rotor 24 of FIG. 1. With this arrangement, the geartrain 72 is in its open mode of operation of FIG. 2C to facilitate, for example, a transition from the first mode of operation to the second mode of operation or a transition from the second mode of operation to the first mode of operation.

Figure 4:
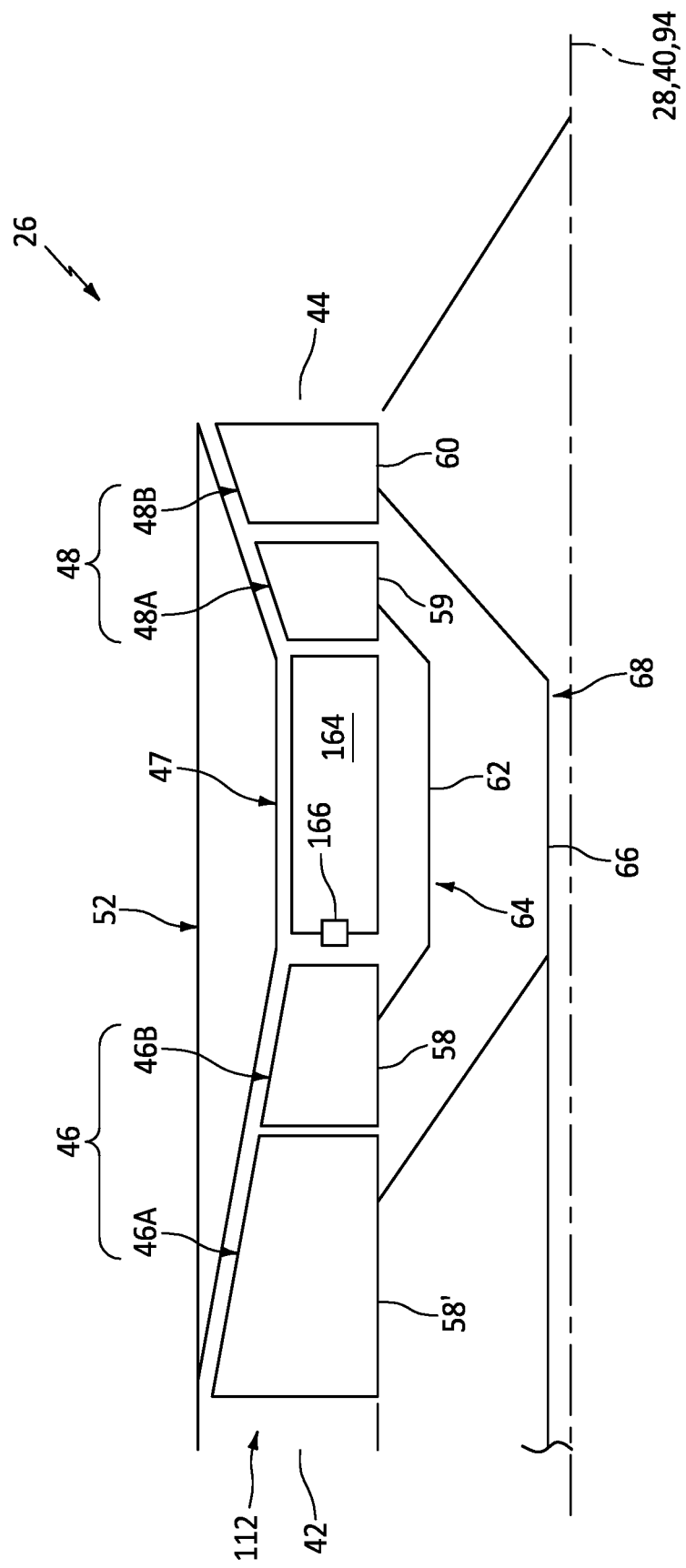
FIG. 4 is a partial schematic illustration of a gas turbine engine core with multi-staged compressor rotors.

In some embodiments, referring to FIG. 1, the low speed rotating structure 68 may be configured without a compressor rotor. In other embodiments, referring to FIG. 4, the low speed rotating structure 68 may include a low pressure compressor (LPC) rotor 58' arranged within a low pressure compressor (LPC) section 46A of the compressor section 46. In such embodiments, the compressor rotor 58 may be a high pressure compressor (HPC) rotor within a high pressure compressor (HPC) section 46B of the compressor section 46.

Figure 5:
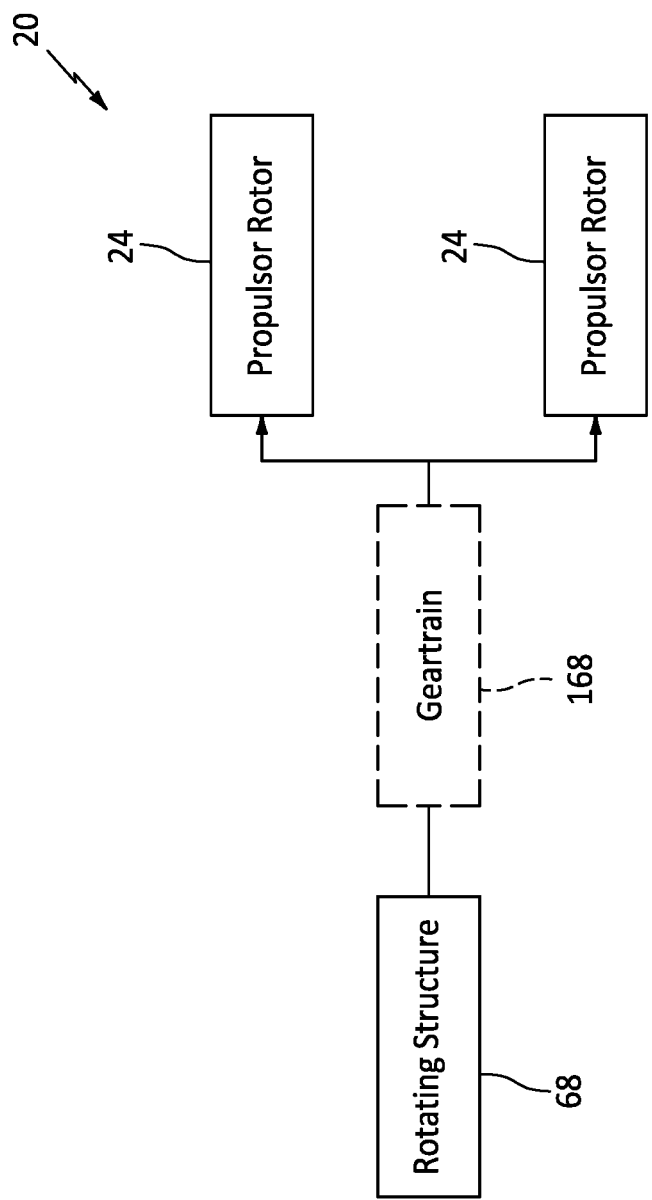
FIG. 5 is a partial schematic illustration of a rotating structure coupled to and driving multiple propulsor rotors for generating propulsive lift.

The engine core 26 (e.g., see FIG. 1) may have various configurations other than those described above. The engine core 26, for example, may be configured with a single spool, with two spools (e.g., see FIG. 1), or with more than two spools. The engine core 26 may be configured with one or more axial flow compressor sections, one or more radial flow compressor sections, one or more axial flow turbine sections and/or one or more radial flow turbine sections. The engine core 26 may be configured with any type or configuration of annular, tubular (e.g., CAN), axial flow and/or reverser flow combustor. The present disclosure therefore is not limited to any particular types or configurations of gas turbine engine cores. Furthermore, it is contemplated the engine core 26 of the present disclosure may drive more than the two propulsors 22 and 24. The aircraft propulsion system 20, for example, may include two or more of the first propulsor rotors 22 and/or two or more of the second propulsor rotors 24. For example, the aircraft propulsion system 20 of FIG. 5 includes multiple second propulsor rotors 24 rotatably driven by the low speed rotating structure 68. These second propulsor rotors 24 may rotate about a common axis. Alternatively, each second propulsor rotor 24 may rotate about a discrete axis where, for example, the second propulsor rotors 24 are laterally spaced from one another and coupled to the low speed rotating structure 68 through a power splitting geartrain 168.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft propulsion system, comprising:
    a compressor section, a combustor section, a turbine section and a flowpath extending sequentially through the compressor section, the combustor section and the turbine section;
    a rotating structure comprising a turbine rotor, the turbine rotor within the turbine section;
    a propulsor rotor, the turbine rotor configured to rotatably drive the propulsor rotor;
    a geartrain, the rotating structure coupled to the propulsor rotor through the geartrain; and
    an auxiliary turbine comprising an auxiliary turbine rotor, the auxiliary turbine rotor configured to rotatably drive the propulsor rotor with the turbine rotor, the auxiliary turbine configured to receive bleed gas from the flowpath, and the auxiliary turbine rotor operatively coupled to the propulsor rotor independent of the geartrain.

2. The assembly of claim 1, wherein the auxiliary turbine is configured to receive bleed air from the compressor section.

3. The assembly of claim 1, wherein
    the compressor section comprises a low pressure compressor section and a high pressure compressor section; and
    the auxiliary turbine is configured to receive bleed air from the high pressure compressor section.

4. The assembly of claim 1, wherein the auxiliary turbine comprises an air turbine.

5. The assembly of claim 1, wherein the auxiliary turbine is configured to increase a rotational speed of the propulsor rotor.

6. The assembly of claim 1, further comprising a brake configured to brake rotation of the propulsor rotor.

7. The assembly of claim 6, wherein the brake comprises a disk brake.

8. The assembly of claim 1, further comprising a lock device configured to lock rotation of the propulsor rotor.

9. The assembly of claim 8, wherein the lock device comprises a splined coupling.

10. The assembly of claim 1, further comprising
    a second propulsor rotor coupled to the rotating structure through the geartrain, the turbine rotor configured to rotatably drive the second propulsor rotor; and
    a second auxiliary turbine comprising a second auxiliary turbine rotor, the second auxiliary turbine rotor configured to rotatably drive the second propulsor rotor with the turbine rotor.

11. The assembly of claim 10, further comprising a brake configured to brake rotation of the second propulsor rotor.

12. The assembly of claim 11, wherein, during a transition from driving rotation of the second propulsor rotor to driving rotation of the propulsor rotor with the rotating structure, the brake is configured to brake rotation of the second propulsor and the auxiliary turbine is configured to speed up rotation of the propulsor rotor.

13. The assembly of claim 10, further comprising a lock device configured to lock rotation of the second propulsor rotor.

14. The assembly of claim 10, wherein a rotational axis of the propulsor rotor is angularly offset from a rotational axis of the second propulsor rotor.

15. An assembly for an aircraft propulsion system, comprising:
    a compressor section, a combustor section, a turbine section and a flowpath extending through the compressor section, the combustor section and the turbine section;
    a turbine rotor within the turbine section, the turbine rotor configured to rotate about an axis;
    a geartrain;
    a propulsor rotor, the turbine rotor configured to rotatably drive the propulsor rotor through the geartrain;
    an auxiliary turbine comprising an auxiliary turbine rotor, the auxiliary turbine rotor configured to rotatably drive the propulsor rotor, the auxiliary turbine disposed to a first side of the geartrain, and the turbine section disposed to a second side of the geartrain that is axially opposite the first side of the geartrain along the axis; and
    a brake configured to brake rotation of the propulsor rotor.

16. The assembly of claim 15, further comprising:
    a second propulsor rotor, the turbine rotor configured to rotatably drive the second propulsor rotor;
    a second auxiliary turbine comprising a second auxiliary turbine rotor, the second auxiliary turbine rotor configured to rotatably drive the second propulsor rotor; and
    a second brake configured to brake rotation of the second propulsor rotor;
    wherein the second auxiliary turbine and the brake are configured to operate together to stop rotation of the propulsor rotor while the turbine rotor remains rotating; and
    wherein the auxiliary turbine and the second brake are configured to operate together to stop rotation of the second propulsor rotor while the turbine rotor remains rotating.

17. The assembly of claim 15, further comprising a lock device configured to lock rotation of the propulsor rotor.

18. The assembly of claim 15, wherein the auxiliary turbine is configured to receive bleed gas from the flowpath and drive rotation of the propulsor rotor.

19. An assembly for an aircraft propulsion system, comprising:

- a compressor section, a combustor section, a turbine section and a flowpath extending through the compressor section, the combustor section and the turbine section;
- a rotating structure comprising a turbine rotor within the turbine section;
- a geartrain coupled to the rotating structure;
- a first propulsor rotor coupled to the geartrain;
- a second propulsor rotor coupled to the geartrain; and
- a control system configured to switch between a first mode and a second mode, the rotating structure configured to drive rotation of the first propulsor rotor through the geartrain during the first mode, the rotating structure configured to drive rotation of the second propulsor rotor through the geartrain during the second mode, and the control system including an air turbine and a brake.

20. The assembly of claim 19, wherein a rotational axis of the first propulsor rotor is angularly offset from a rotational axis of the second propulsor rotor by an angle between sixty degrees and ninety degrees.

\* \* \* \* \*